US009355066B1

(12) United States Patent
Torjyan et al.

(10) Patent No.: US 9,355,066 B1
(45) Date of Patent: May 31, 2016

(54) ACCELERATED CALCULATION OF ARRAY STATISTICS

(71) Applicant: Marvell International Ltd., Hamilton (BM)

(72) Inventors: Gevorg Torjyan, Fremont, CA (US); Sohail Syed, San Jose, CA (US); Hillel Gazit, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 275 days.

(21) Appl. No.: 14/064,953

(22) Filed: Oct. 28, 2013

Related U.S. Application Data

(60) Provisional application No. 61/738,299, filed on Dec. 17, 2012.

(51) Int. Cl.
*G06F 17/10* (2006.01)

(52) U.S. Cl.
CPC ...................................... *G06F 17/10* (2013.01)

(58) Field of Classification Search
None
See application file for complete search history.

(56) References Cited

U.S. PATENT DOCUMENTS

| | | | | |
|---|---|---|---|---|
| 5,095,457 A | * | 3/1992 | Jeong | G06F 7/607 |
| | | | | 708/210 |
| 5,721,697 A | * | 2/1998 | Lee | G06F 7/509 |
| | | | | 708/620 |
| 5,978,827 A | * | 11/1999 | Ichikawa | G06F 7/509 |
| | | | | 708/210 |
| 6,141,743 A | | 10/2000 | Strongin | |
| 6,553,453 B1 | | 4/2003 | Gibson | |
| 6,760,880 B1 | | 7/2004 | Ofek | |
| 6,775,167 B1 | | 8/2004 | Avramescu | |
| 6,792,502 B1 | | 9/2004 | Pandya | |
| 6,938,061 B1 | * | 8/2005 | Rumynin | G06F 7/5318 |
| | | | | 708/210 |
| 7,245,623 B1 | | 7/2007 | Cheriton | |
| 7,440,460 B2 | | 10/2008 | Wybenga | |
| 7,852,850 B2 | | 12/2010 | Kopelman | |
| 7,859,877 B2 | | 12/2010 | Mondaeev | |
| 7,924,628 B2 | | 4/2011 | Danon | |
| 7,978,700 B2 | | 7/2011 | Kopelman | |
| RE43,359 E | | 5/2012 | Avramescu | |
| 8,667,046 B2 | * | 3/2014 | Brisk | G06F 7/607 |
| | | | | 708/490 |

(Continued)

FOREIGN PATENT DOCUMENTS

WO    WO2006046237 A3    8/2006

OTHER PUBLICATIONS

Ripple Counter—Basic Digital Electronics Course; http://electronics-course.com/ripple-counter, downloaded Oct. 11, 2013, 2 pages.

(Continued)

*Primary Examiner* — David H Malzahn

(57) ABSTRACT

The present disclosure describes systems and techniques relating to calculation of array statistics. According to an aspect of the described systems and techniques, a device includes: a memory configured to store a data array and a counter array, wherein the data array includes multiple values, and each of the multiple values is encoded in a respective row of the data array, and wherein the counter array includes multiple counters, respective columns of the counter array correspond to respective ones of the counters, and rows of the counter array correspond with bit significance positions spanning the multiple counters; and processor electronics configured to add up a number bits found in respective columns of the data array using respective ones of the multiple counters.

12 Claims, 4 Drawing Sheets

(56) References Cited

U.S. PATENT DOCUMENTS

| | | |
|---|---|---|
| 8,719,917 B1 | 5/2014 | Ammundi |
| 2004/0003170 A1 | 1/2004 | Gibson |
| 2008/0263269 A1 | 10/2008 | Kadosh |
| 2009/0043956 A1 | 2/2009 | Ford |
| 2009/0207946 A1 | 8/2009 | Sebeni |
| 2012/0137060 A1 | 5/2012 | Akerib |

OTHER PUBLICATIONS

Agrawal, Banit et al., "Modeling TCAM Power for Next Generation Network Devices", In Proceedings of IEEE International Symposium on Performance Analysis of Systems and Software (ISPASS-2006), pp. 1-10.
Arsovski, Igor et al., "A Ternary Content-Addressable Memory (TCAM) Based on 4T Static Storage and Including a Current-Race Sensing Scheme", IEEE Journal of Solid-State Circuits, vol. 38, No. 1, Jan. 2003, pp. 155-158.
Content-addressable memory, Wikipedia, the free encyclopedia, Published on the Internet, downloaded Aug. 28, 2013, pp. 1-4.
H. Corporaal, "Automatic Heapmanagement and Realtime Performance", Delft University of Technology, Faculty of Electrical Engineering, pp. 290-295, 1991.
I2C, Wikipedia, the free encyclopedia, Published on the Internet, downloaded Sep. 11, 2013, pp. 1-15.
IPv6, Wikipedia, the free encyclopedia, Published on the Internet, downloaded Sep. 10, 2013, pp. 1-15.
Joint Test Action Group, Wikipedia, the free encyclopedia, Published on the Internet, downloaded Sep. 11, 2013, pp. 1-15.
Ke Bai et al, "Automatic and Efficient Heap Data Management for Limited Local Memory Multicore Architectures", Compiler and Microarchitecture Laboratory, Arizona State University, 6 pages, 2013.
Longest prefix match, Wikipedia, the free encyclopedia, Published on the Internet, downloaded Aug. 28, 2013, 1 page.
SerDes, Wikipedia, the free encyclopedia, Published on the Internet, downloaded Sep. 11, 2013, pp. 1-4.
Shannon, C.E., "A Mathematical Theory of Communication", Reprinted with corrections from The Bell System Technical Journal, vol. 27, pp. 379-423, 623-656, Jul., Oct. 1948, 55 pages.
Shannon's source coding theorem, Wikipedia, the free encyclopedia, Published on the Internet, downloaded Sep. 3, 2013, pp. 1-5.
U.S. Appl. No. 14/049,712, Office Action mailed Jun. 5, 2015, 12 pages.
U.S. Appl. No. 14/049,696, Office Action mailed Jun. 25, 2015, 16 pages.
U.S. Appl. No. 14/049,781, filed Oct. 9, 2013, 70 pages.

* cited by examiner

ACCELERATED CALCULATION OF ARRAY STATISTICS

CROSS REFERENCE TO RELATED APPLICATIONS

This application claims the benefit of the priority under 35 U.S.C. §119(e) from U.S. Provisional Application Ser. No. 61/738,299, filed Dec. 17, 2012 and entitled "ACCELERATED CALCULATION OF THE ARRAY STATISTICS", which is hereby incorporated by reference.

BACKGROUND

The present disclosure describes systems and techniques relating to calculation of array statistics.

Various systems employ techniques to calculate statistical parameters of an array of data. In some cases, the calculation of array statistics needs to be performed in a computer memory using main central processing unit (CPU) resources. In addition, in some cases, the calculation requires bit level operations. FIG. 1 shows a traditional approach to bit level counting of an array of data. An input bit array 100 is arranged in the memory in k n bit wide words. There are n corresponding counters 110, where results of series of calculation operations 120-1 through 120-n are stored in corresponding counters 1 through n, and each counter represents a number of bits set equal to one in the corresponding column of the input bit array's columns 1 through n.

SUMMARY

The present disclosure describes systems and techniques relating to calculation of array statistics. According to an aspect of the described systems and techniques, a device includes: a memory configured to store a data array and a counter array, wherein the data array includes multiple values, and each of the multiple values is encoded in a respective row of the data array, and wherein the counter array includes multiple counters, respective columns of the counter array correspond to respective ones of the counters, and rows of the counter array correspond with bit significance positions spanning the multiple counters; and processor electronics configured to add up a number bits found in respective columns of the data array using respective ones of the multiple counters.

The processor electronics can operate using n bit wide words, and the processor electronics can be configured to (i) retrieve data from the data array in the n bit wide words, (ii) AND the retrieved n bit wide words with an n bit wide portion of the multiple counters to generate an n bit wide carry array, (iii) XOR the retrieved n bit wide words with the n bit wide portion of the multiple counters, and while the n bit wide carry array remains non-zero, (iv) AND the n bit wide carry array with a next n bit wide portion of the multiple counters to update the n bit wide carry array, and XOR the n bit wide carry array with the next n bit wide portion of the multiple counters.

The device can have a value of n that is eight, sixteen, thirty two, sixty four, or one hundred and twenty eight, e.g., depending on the processor architecture. In addition, the memory of the device can include a Random Access Memory (RAM).

According to another aspect of the described systems and techniques, a method includes: obtaining rows of a bit array (e.g., an array of networking data); for each of the rows, counting column bits of the row in parallel; and providing counter outputs, wherein respective counter outputs represent a number of bits set in respective columns of the bit array. This and other methods can be implemented using a non-transitory computer-readable medium encoding a program operable to cause a device to operations of the method(s). For example, a program can be operable to cause a network device to preprocess an array of networking data, where the network device preprocessing includes the method(s).

The counting can include: ANDing a zeros position of a counter array with a next row of the rows of the bit array to obtain a carry result, wherein the zeros position, the next row and the carry result are each stored in a machine word size of a hardware processor performing the method, and data in the zeros position machine word represents a least significant bit for each of the counters in the counter array; XORing the zeros position with the next row to update the zeros position of the counter array; and while the carry result remains greater than zero, propagating the carry result into higher significant bit positions of the counters in the counter array using further ANDing and XORing, wherein each of the higher significant bit positions of the counters in the counter array is stored in the machine word size of the hardware processor performing the method.

The hardware processor can be a central processing unit, and the machine word size can be a power of two (e.g., eight, sixteen, thirty two, sixty four, or one hundred and twenty eight bits wide). In addition, the obtaining can include retrieving rows of the bit array from a Random Access Memory (RAM) device.

According to another aspect of the described systems and techniques, an apparatus includes: a memory device to hold a data array; and software-based ripple counter means for calculating array statistics for the data array when held in the memory device. The software-based ripple counter means for calculating array statistics can include: a central processing unit (CPU) having a word size; and a medium having encoded instructions to cause the CPU to (i) XOR inputs, which are each in the word size of the CPU, to find counter values in an array of counters stored vertically, and (ii) ripple any carries through the array of counters from a least significant bit a most significant bit.

The word size of the CPU can be eight, sixteen, thirty two, sixty four, or one hundred and twenty eight bits wide. The CPU can include the memory device, and the medium encoded instructions can further cause the CPU to use the array statistics in preprocessing networking data for hashing in a network search engine. Moreover, the memory device can include a Random Access Memory (RAM) device.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiments below can be implemented in various systems and apparatus, including, but not limited to, a special purpose data processing apparatus (e.g., a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus (e.g., a minicomputer, a server, a mainframe, a supercomputer), or combinations of these.

The described systems and techniques can result in accelerated calculation of array statistics. This can significantly improve performance for systems that need array statistics for large data arrays. For example, in a network search engine that handles two million, eighty bit wide entries of network routing rules and employs algorithmic techniques to quickly search the entries for the network routing rules, updated array statistics can be needed for large amounts of array data on a frequent basis. Using the systems and techniques described herein, the numbers of ones (and consequently the number of zeros) in each column of a large data array can be readily counted, with substantial reductions in the needed computer processing time. Moreover, the computer system's caching operations can operate more effectively when the processor operates on consecutive words of data, meaning the present algorithm can result in improved cache usage by the processor.

Details of one or more implementations are set forth in the accompanying drawings and the description below. Other features and advantages may be apparent from the description and drawings, and from the claims.

DRAWING DESCRIPTIONS

DETAILED DESCRIPTION

Figure 2:
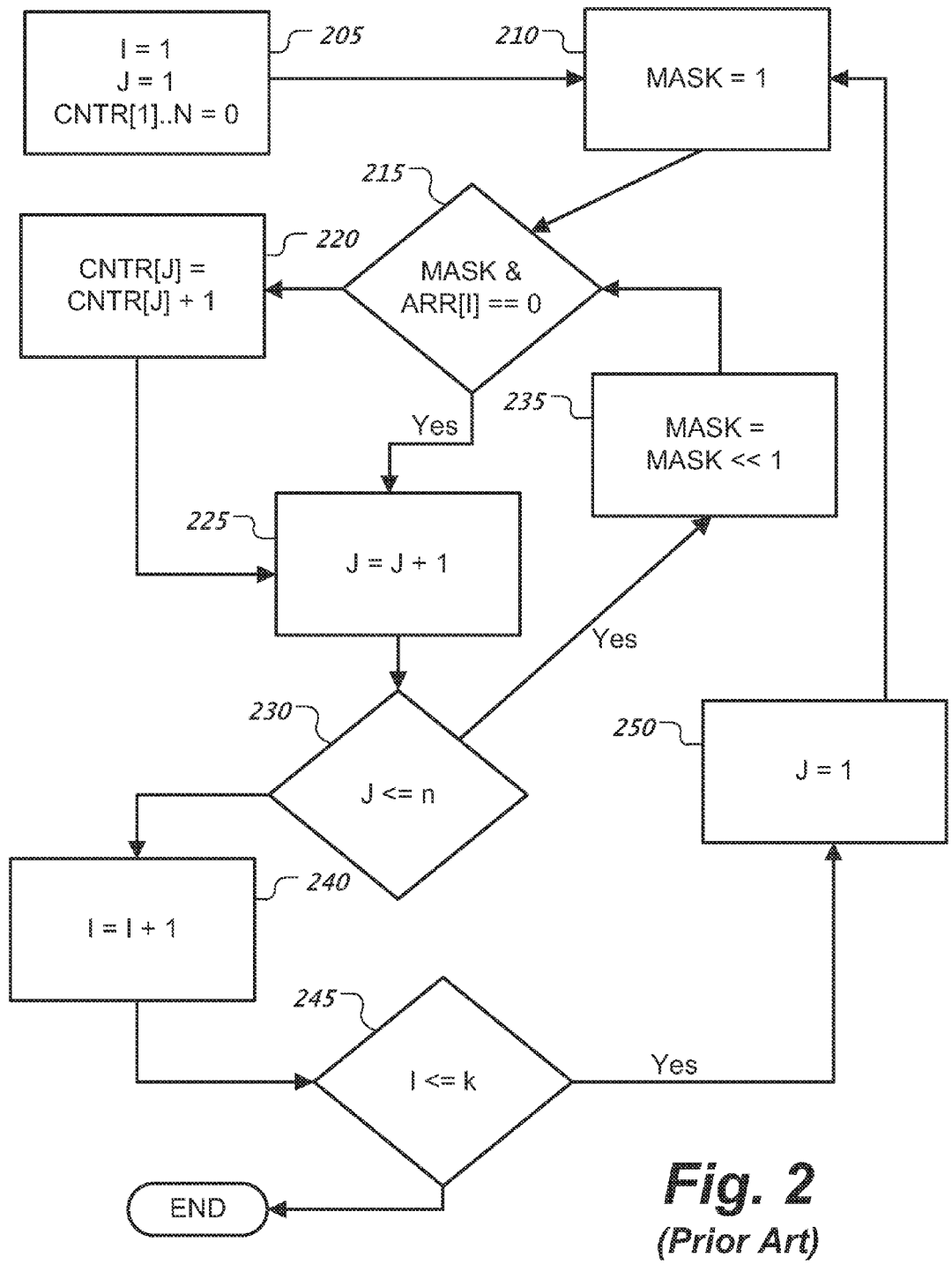
FIG. 2 shows a traditional algorithm to count bit level array data.

FIG. 2 shows a traditional algorithm to count bit level array data. Note that a CPU cannot perform operations on the individual bits of an input array, and the CPU can operate on a machine word in each cycle. A traditional approach to using a CPU to count bit level array data involves extracting individual bits from each word and then performing operations accordingly.

At 205, loop counters I and J are set to one, and data counters CNTR[1] through CNTR[n] are set to zero. At 210, a mask value MASK is set to one (e.g., for 16 bit word processing, MASK=0000000000000001). At 215, the MASK is ANDed with a first value in a data array ARR[ ] to identify whether a least significant bit position in the first value is set to one. If so, the counter for that bit position is incremented at 220. In either case, the bit position loop counter J is incremented at 225. While additional bit positions remain to be checked for the current data array value at 230, the MASK value is left shifted at 235 (e.g., MASK=0000000000000010), and the process continues to increment each appropriate counter for respective bit positions in the current data array value after shifting the MASK value to check the next bit position of the current data array value.

Once all the bit positions for the current data array value have been checked, the array position loop counter I is incremented at 240. While values from the data array ARR[ ] remain to be counted at 245, the bit position loop counter J is reset to one at 250, the mask value MASK is reset to one at 210, and the process continues for the next value in the data array, ARR[I].

As shown in FIG. 2, operating on each word in the array requires n SHIFT operations, n AND operations, and n*2 ADD operations to update a counter value for each corresponding column of the array. Although there are different ways to optimize the process of FIG. 2, most variations will still require performing the main loop 215-235 n times for each word. Thus, a rough calculation of the total number of operations used to process a k word array of n bit width will be k*n*4.

Figure 3A:
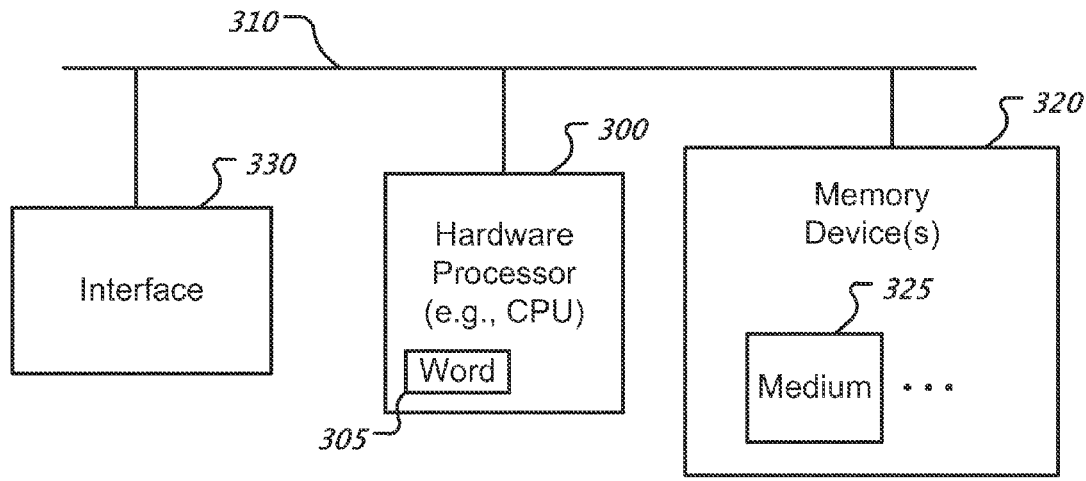
FIG. 3A shows an example of a system for use in calculation of array statistics.

FIG. 3A shows an example of a system for use in calculation of array statistics. The system includes a hardware processor 300 connected with a system bus 310. The hardware processor 300 can be a central processing unit (CPU) of a larger apparatus or device. For example, the hardware processor 300 can be the CPU of a network packet processing apparatus. In any case, the hardware processor 300 can have machine word size 305, which is the specified bit length of data operations within the processor 300 (e.g., corresponding to the bit length of data registers within the hardware processor 300, such as 32 bit or 64 bit, or other machine process word size for a given computer architecture).

The system can include one or more memory devices 320, which can store array data, program instructions for the hardware processor 300, or both. Each memory device 320 can include a medium 325 used to retain data, and can be local or remote. For example, a memory device 320 can include volatile Random Access Memory (RAM) where the medium 325 constitutes RAM circuitry. As another example, a memory device 320 can include non-volatile storage where the medium 325 can be a magnetic recording medium of a disk drive.

In addition, the system can include one or more hardware interfaces 330 for connecting with other systems and devices. For example, the memory device 320 can include memory for storing network forwarding and routing data for algorithmic ternary content addressable memory (TCAM) processing in a network device, and the one or more hardware interfaces 330 can include input/output ports for receiving and sending network packet information. For further details regarding TCAM systems and techniques, see U.S. patent application Ser. No. 14/049,781, filed on Oct. 9, 2013, which application is hereby incorporated by reference. Thus, in some implementations, the system of FIG. 3A can be one or more integrated circuit (IC) devices, a larger device, such as a router or switch, or a network communications apparatus. In some implementations, the system of FIG. 3A is a search engine in a network device that preprocess arrays of networking data to facilitate forwarding and routing activities.

In any case, array statistics are needed for a data array retained in a memory device 320, the hardware processor 300, or both. For example, the array statistics needed can be the number of ones in each respective column of the data array, which can be used to facilitate data storage and retrieval an algorithmic TCAM system. For example, the bit counts data for the data array can be used by a network search engine in deciding which columns to use as inputs for hashing when setting up its networking rules database (e.g., columns that are closest in their numbers of zeros and ones); columns should be selected so as to reduce collisions when hashing it used to quickly find the appropriate portion of the rules database in response to an incoming packet. In such systems, the calculation of array statistics may be needed many times, and the present systems and techniques can thus substantially improve performance of such systems.

Figure 3B:
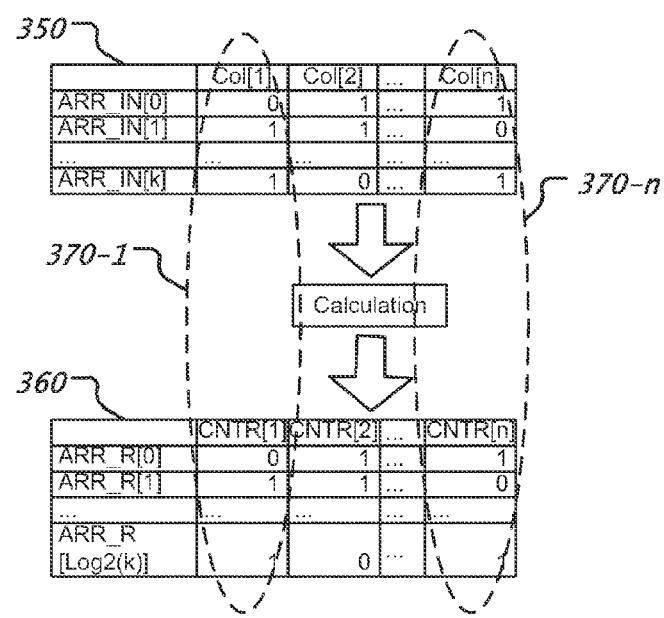
FIG. 3B shows an example of an arrangement of data for use in calculation of array statistics.

FIG. 3B shows an example of an arrangement of data for use in calculation of array statistics. An input array 350 is labeled ARR_IN[ ]. The input array 350 is a two dimensional array where a count of the number of ones in each column is needed since the information represented in the array can be column specific (e.g., the data bits need not correspond to bit significance in a base-2 number). The calculation of the counts can be performed using software that mimics a ripple counter. This software can be designed to process all bits of a CPU word in a single operation and avoid the necessity of extracting individual bits.

As shown in FIG. 3B, the input array 350 is arranged in (k+1) n bit wide words in the memory, but the n counters are stored vertically (rather than horizontally) in memory in a ripple counter array 360, which is labeled ARR_R[ ] and has Log 2(k) n bit wide words. Note that the data array 350 can be of fixed length, n, but have an arbitrary depth, k. Thus, the width of the counter array 360 can be the same fixed length, n, and the depth of the counter array 360 can be set just before calculating the statistics for the data array 350 using counter array 360. In addition, the calculation operations 370-1 through 370-$n$ can be performed in parallel, rather than in series, since the processor can operate on two data words in one cycle, and the results of incrementing counter 1 through counter n ripple through the counter array 360 as the carry for each column is propagated until fully accounted for.

Figure 1:
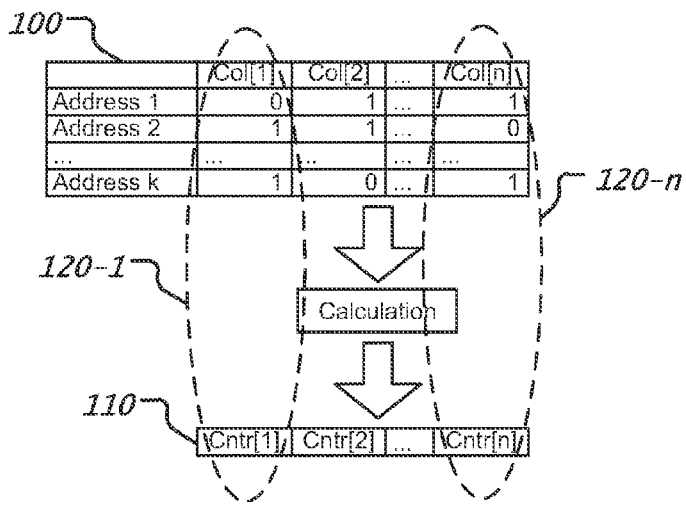
FIG. 1 shows a traditional approach to bit level counting of an array of data.
Figure 4:
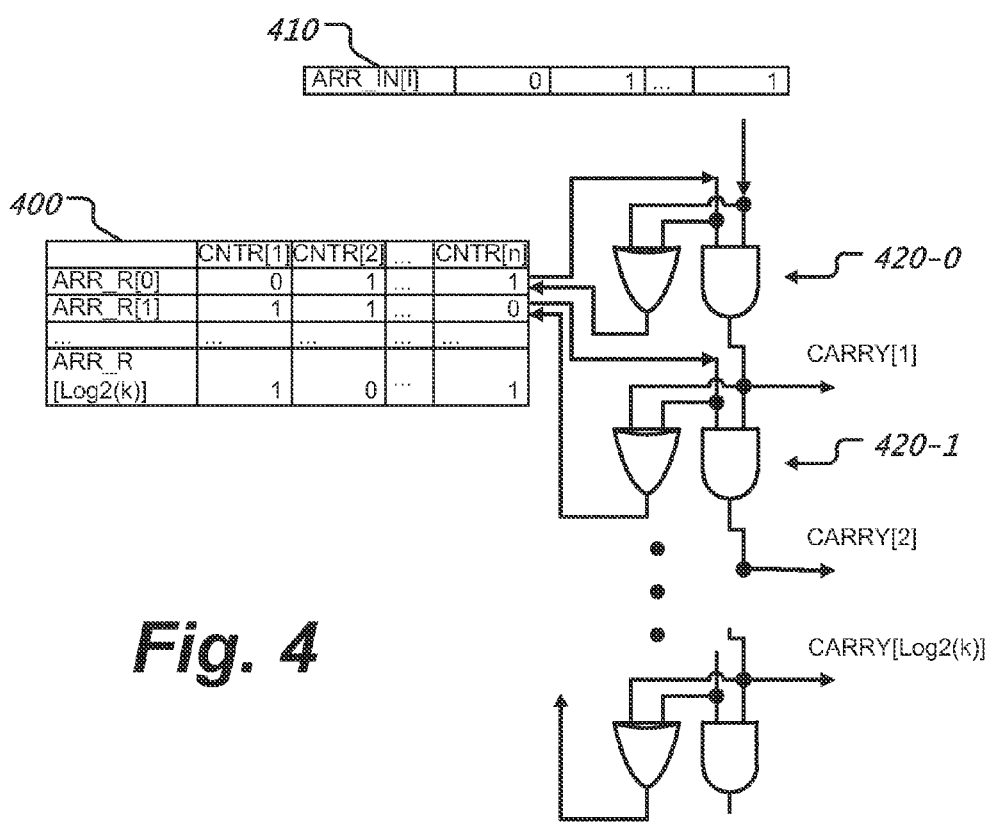
FIG. 4 shows an example of ripple counter operations performed for a counter array.

FIG. 4 shows an example of ripple counter operations performed for a counter array 400. A next word 410 from the data array (ARR_IN[I]) has been obtained, and the individual bits of this next word 410 are to be counted. At an initial stage 420-0, one AND operation and one XOR operation are each performed on the next word 410 and a word zero (ARR_R[0]) of the counter array 400. The result of the XOR operation is the addition result for word zero of the counter array 400 (ARR_R[0]) and thus overwrites that part of the counter array 400. Note that word zero of the counter array 400 (ARR_R[0]) represents the least significant bit position of each of the n counters in the array 400.

The result of the AND operation is the carry result that may need to be combined with remaining words of the counter array 400 to ripple the carry bits through the higher significant bits of the counters at following stage 420-1 and so on (CARRY[1], CARRY[2], . . . , CARRY [Log 2(k)]). The input and output for each AND plus XOR operations set includes zeros and ones of the word element of the counter array 400, ARR_R. Since a CPU can perform a bitwise operation in each clock cycle, it can process n bits simultaneously. Thus, the AND and XOR gates shown for each calculation stage 420 represent the same AND and XOR circuitry used by the CPU when operating on a word of data (e.g., using n bit wide data registers for the AND and XOR operations).

Figure 5:
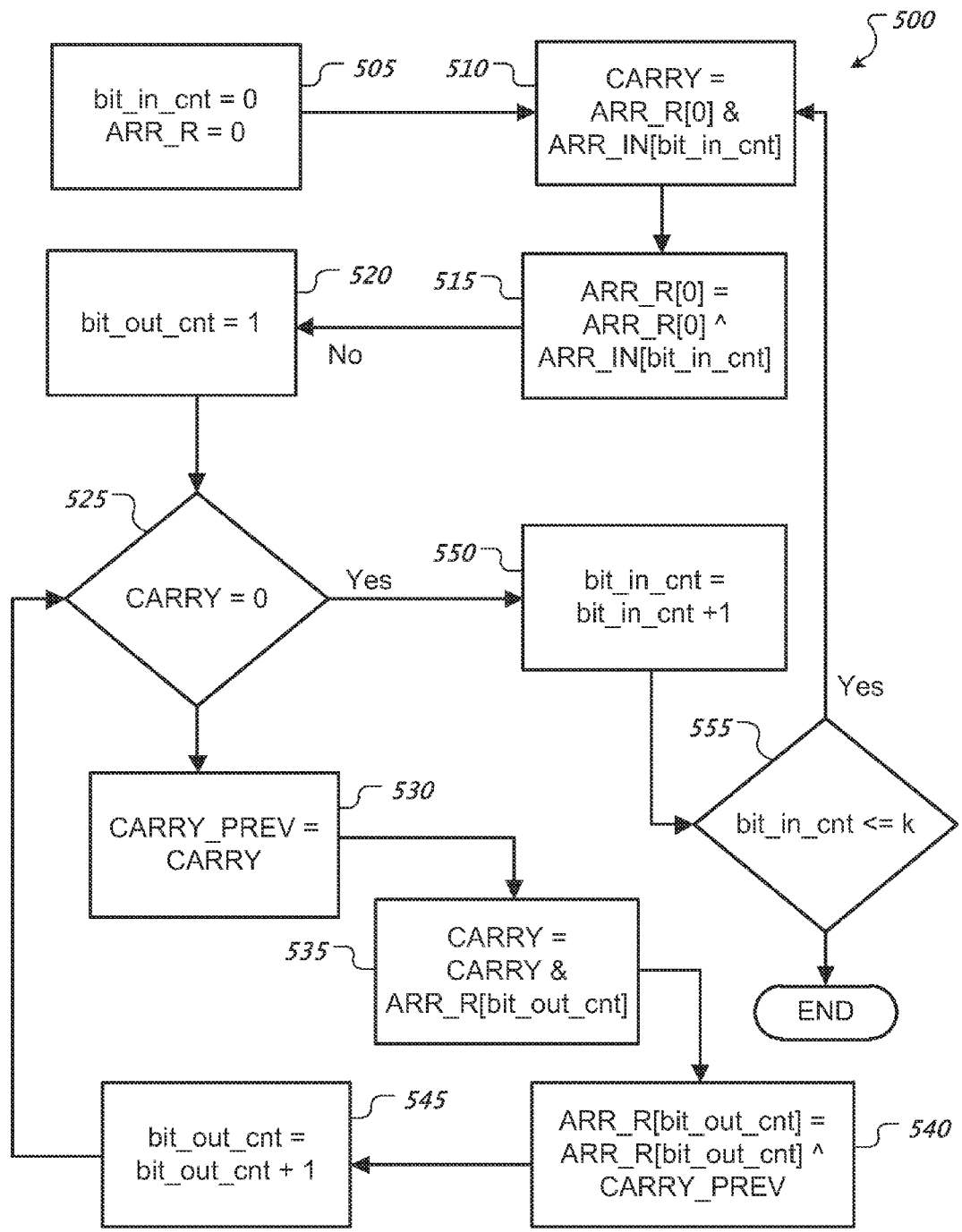
FIG. 5 shows an example of an algorithm for using software to effect a ripple counter for calculating array statistics.

FIG. 5 shows an example of an algorithm for using software to effect a ripple counter for calculating array statistics. At 505, an array position loop counter (bit_in_cnt) and a ripple counter array (ARR_R) are set to zero. At 510, a carry bits array (CARRY) is set equal to the bitwise AND of entry zero of the ripple counter array (ARR_R[0]) with a current data word of the data array (ARR_IN[bit_in_cnt]). At 515, entry zero of the ripple counter array (ARR_R[0]) is set equal to the bitwise XOR of itself (ARR_R[0]) with the current data word of the data array (ARR_IN[bit_in_cnt]). This records any additions (in any of the n counters) resulting from corresponding set bit positions of the current data word of the data array, but any carry bits for these bit positions still need to be processed.

At 520, a bit position loop counter (bit_out_cnt) is set to one. While the carry bits array (CARRY) is non-zero at 525, the carry bits are processed. At 530, the current carry bits array (CARRY) is copied to be a previous carry bits array (CARRY_PREV). At 535, the current carry bits array (CARRY) is set equal to the bitwise AND of the current carry bits array (CARRY) with a next entry of the ripple counter array (ARR_R[bit_out_cnt]). Thus, any further carry bits are propagated to next cycle of the carry processing loop.

At 540, the next entry of the ripple counter array (ARR_R [bit_out_cnt]) is set equal to the bitwise XOR of the ripple counter array (ARR_R[bit_out_cnt]) and the previous carry bits array (CARRY_PREV). Thus, the carry bits have been accounted for in the counters at this next highest bit position of the vertically stored counters. The bit position loop counter (bit_out_cnt) is incremented at 545, and the process continues. It usually takes about four iterations to finish, but this will vary with the data in the carry array (CARRY) as compared with the values in the ripple counter array (ARR_R[ ]) through which the carries propagate.

Once the carry bits array (CARRY) is zero at 525, the array position loop counter (bit_in_cnt) is incremented at 550. While there remain further data words in the data array to be counted (because bit_in_cnt<=k) at 555, the process returns to set a new carry bits array (CARRY) at 510 and proceeds with counting the bits set in the next data word.

Note that the modified algorithm requires approximately four loops per processed word (on average) depending on the data distribution. In some implementations, where a CPU word is 64 bit wide, the modified algorithm can improve calculation speed by a factor of 10 compared to the prior art. The following C implementation of the described algorithm further illustrates some details. In the program, arr_r is the result array and arr_in is the input array.

```
unsigned long long int arr_in[NB_IN], arr_r[NB_OUT], carry, carry_prev;
unsigned int bit_in_cnt, bit_out_cnt;
for (bit_in_cnt = 1; bit_in_cnt < NB_IN; ++bit_in_cnt)
{
   carry = arr_r[O] & arr_in[bit_in_cnt];
   arr_r[0] ^ = arr_in[bit_in_cnt];
   bit_out_cnt =1;
   while(carry !=0)
   {
      carry_prev = carry;
      carry &= arr_r[bit_out_cnt];
      arr_r[bit_out_cnt] ^ = carry_prev;
      ++bit_out_cnt;
   }
}
```

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A device comprising:
   a memory configured to store a data array and a counter array, wherein the data array comprises multiple values, and each of the multiple values is encoded in a respective row of the data array; and
   processor electronics configured to add up a number bits found in respective columns of the data array by treating respective columns of the counter array as respective ones of multiple counters with rows of the counter array corresponding to bit significance positions spanning the multiple counters; and
   wherein the processor electronics operate using n bit wide words, and the processor electronics are configured to (i) retrieve data from the data array in the n bit wide words, (ii) AND the retrieved n bit wide words with an n bit wide portion of the multiple counters to generate an n bit wide carry array, (iii) XOR the retrieved n bit wide words with the n bit wide portion of the multiple counters, and while the n bit wide carry array remains non-zero, (iv) AND the n bit wide carry array with a next n bit wide portion of the multiple counters to update the n bit wide carry array, and XOR the n bit wide carry array with the next n bit wide portion of the multiple counters.

2. The device of claim 1, wherein n is sixty four.

3. The device of claim 1, wherein the memory comprises a Random Access Memory (RAM).

4. A method comprising:
   obtaining rows of a bit array;
   counting column bits of the rows in parallel to obtain counter outputs, wherein the counting comprises
     ANDing a zeros position of a counter array with a next row of the rows of the bit array to obtain a carry result, wherein the zeros position, the next row and the carry result are each stored in a machine word size of a hardware processor performing the method, and data in the zeros position machine word represents a least significant bit for each of the counters in the counter array,
     XORing the zeros position with the next row to update the zeros position of the counter array, and
     while the carry result remains greater than zero, propagating the carry result into higher significant bit positions of the counters in the counter array using further ANDing and XORing, wherein each of the higher significant bit positions of the counters in the counter array is stored in the machine word size of the hardware processor performing the method; and
   providing the counter outputs, wherein respective counter outputs represent a number of bits set in respective columns of the bit array.

5. The method of claim 4, wherein the hardware processor is a central processing unit, and the machine word size is sixty four bits wide.

6. The method of claim 4, wherein the obtaining comprises retrieving rows of the bit array from a Random Access Memory (RANI) device.

7. A non-transitory computer-readable medium encoding a program operable to cause a device to perform a method comprising:
   obtaining rows of a bit array;
   counting column bits of the rows in parallel to obtain counter outputs, wherein the counting comprises
     ANDing a zeros position of a counter array with a next row of the rows of the bit array to obtain a carry result, wherein the zeros position, the next row and the carry result are each stored in a machine word size of a hardware processor performing the method, and data in the zeros position machine word represents a least significant bit for each of the counters in the counter array,
     XORing the zeros position with the next row to update the zeros position of the counter array, and
     while the carry result remains greater than zero, propagating the carry result into higher significant bit positions of the counters in the counter array using further ANDing and XORing, wherein each of the higher significant bit positions of the counters in the counter array is stored in the machine word size of the hardware processor performing the method; and providing the counter outputs, wherein respective counter outputs represent a number of bits set in respective columns of the bit array.

8. The non-transitory computer-readable medium of claim 7, wherein the hardware processor is a central processing unit, and the machine word size is sixty four bits wide.

9. The non-transitory computer-readable medium of claim 7, wherein the obtaining comprises retrieving rows of the bit array from a Random Access Memory (RAM) device.

10. An apparatus comprising:
a memory device to hold a data array;
a central processing unit (CPU) having a word size; and
software-based ripple counter means for calculating array statistics by causing
the CPU to (i) XOR data array inputs, which are each in the word size of the CPU, to find counter values in an array of counters stored vertically with respect to the word size of the CPU in relation to the memory device, and (ii) ripple any carries from the found counter values through the array of counters from a least significant bit to a most significant bit.

11. The apparatus of claim 10, wherein the CPU and the memory device are both included in one integrated circuit device.

12. The apparatus of claim 10, wherein the memory device comprises a Random Access Memory (RAM) device.

* * * * *